United States Patent [19]
Hansen

[11] Patent Number: 5,713,583
[45] Date of Patent: Feb. 3, 1998

[54] UTILITY CART FOR CONCRETE FINISHING OPERATIONS

[76] Inventor: Thomas E. Hansen, 9665 W. 82nd Pl., Arvada, Colo. 80005

[21] Appl. No.: 560,667

[22] Filed: Nov. 20, 1995

[51] Int. Cl.⁶ .................................................. B62B 1/26
[52] U.S. Cl. .............................. 280/47.19; 280/47.26; 280/79.5
[58] Field of Search ..................... 280/79.11, 79.5, 280/47.19, 47.2, 47.23, 47.24, 47.26, 47.315, 47.33; D32/39, 24, 27, 16; 224/282, 928

[56] References Cited

U.S. PATENT DOCUMENTS

| | | | |
|---|---|---|---|
| D. 146,848 | 6/1947 | Brickson | 280/47.19 |
| 337,870 | 3/1886 | Roberts . | |
| 0,436,373 | 9/1890 | McDonna | 280/47.19 |
| 517,642 | 4/1894 | Campbell . | |
| 0,759,495 | 5/1904 | Baines | 280/47.19 |
| 978,562 | 12/1910 | Choate . | |
| 1,650,249 | 4/1927 | Venable . | |
| 1,832,523 | 11/1931 | Berger . | |
| 2,324,747 | 7/1943 | Weissert | 248/142 |
| 2,475,278 | 7/1949 | Coakley | 280/51 |
| 2,683,012 | 7/1954 | Reinsma | 248/129 |
| 2,855,210 | 10/1958 | Joyce | 280/47.19 |
| 3,389,818 | 6/1968 | Rinehart | 214/372 |
| 3,479,047 | 11/1969 | Bailey | 280/47.19 |
| 4,187,950 | 2/1980 | Peet | 414/421 |
| 4,313,701 | 2/1982 | Brust | 410/52 |
| 4,362,309 | 12/1982 | Stamper | 280/47.33 |
| 5,159,777 | 11/1992 | Gonzalez | 280/47.19 |
| 5,203,815 | 4/1993 | Miller | 43/21.2 |
| 5,318,315 | 6/1994 | White et al. | 280/47.26 |
| 5,370,409 | 12/1994 | Latouche | 280/47.26 |
| 5,380,033 | 1/1995 | Harling | D34/24 |

FOREIGN PATENT DOCUMENTS

| | | | |
|---|---|---|---|
| 1438546 | 4/1966 | France | 280/47.19 |
| 2634716 | 7/1988 | France | B62B 1/06 |
| 0732276 | 6/1955 | United Kingdom | 280/47.19 |

*Primary Examiner*—Anne Marie Boehler
*Attorney, Agent, or Firm*—John E. Reilly

[57] ABSTRACT

A water cart for suspension of a water bucket for use in concrete finishing work employs an elongated open frame oriented substantially horizontally relative to a ground support surface and which extends in a substantially horizontal direction away from a wheel axle at one end toward a handle affixed at an opposite end. A bucket or container is pivotally suspended between the wheel axle and handle from the upper free ends of a generally U-shaped bracket that also serves as a ground support for the cart. Tool supports disposed at the wheel end of the open frame, which are generally cylindrical and adapted to receive and support long-handled work tools. The bucket's intermediate placement on the frame and pivotal suspension from the bracket allow the bucket to remain in a generally upright position, even when the cart is rested on an inclined surface, thus preventing tipping and spillage.

13 Claims, 1 Drawing Sheet

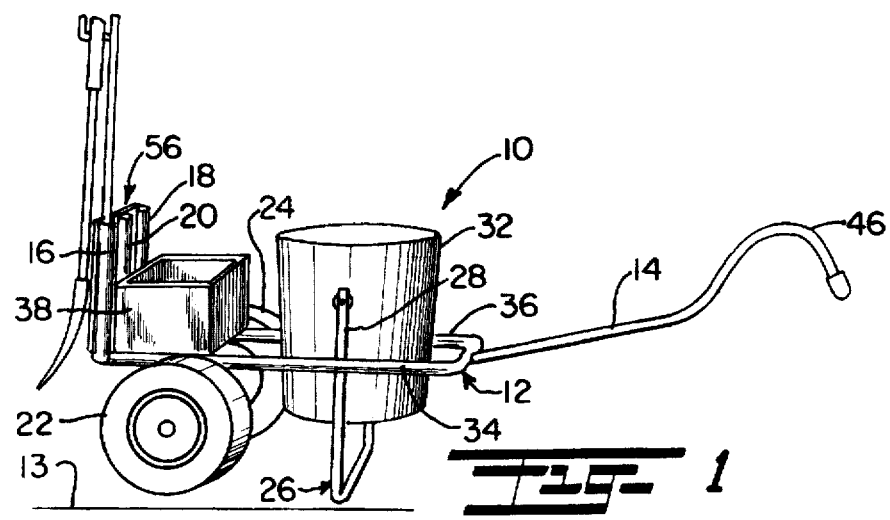
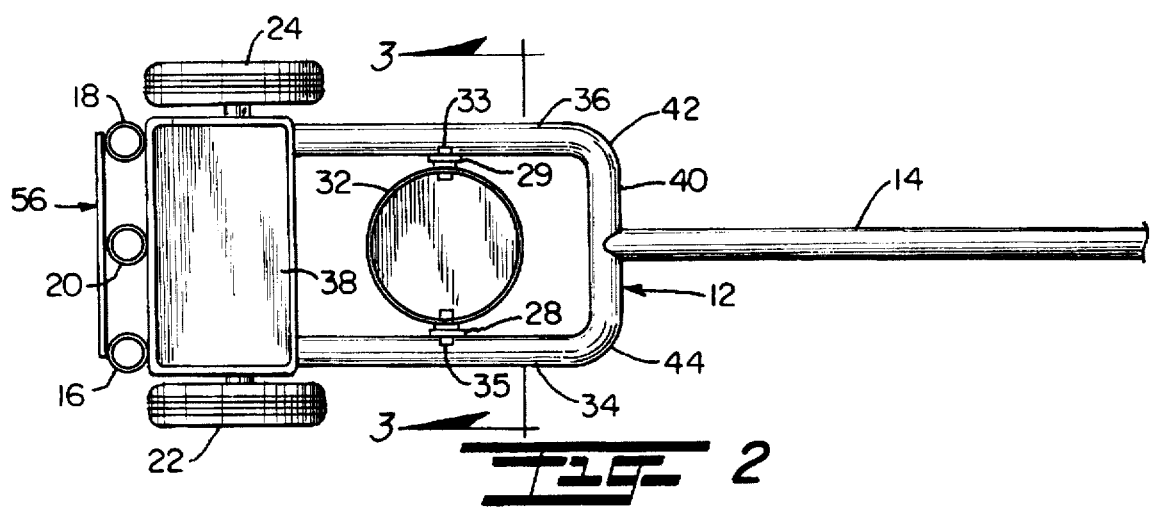
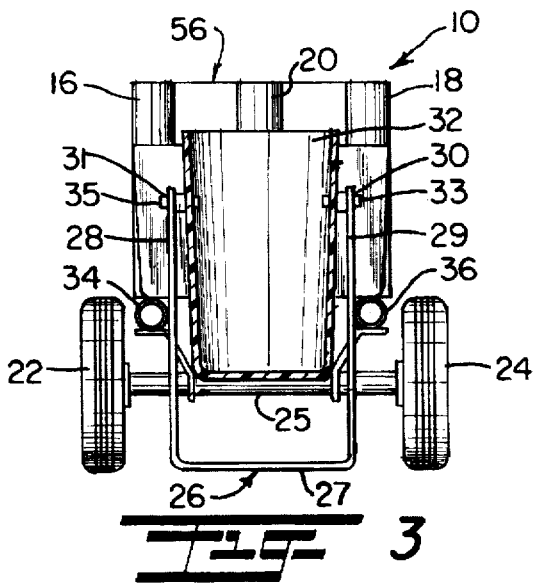

UTILITY CART FOR CONCRETE FINISHING OPERATIONS

BACKGROUND AND FIELD OF INVENTION

This invention relates generally to utility carts for transporting tools and other supplies which a worker can pull as he or she works. More particularly, the present invention relates to a cart especially useful in drywall and concrete finishing work or gardening and that can carry and suspend a large container of water in an upright position, which also can carry a toolbox, and which can hold other equipment, such as, brooms, rakes, or shovels in an upright position.

A variety of utility carts have been developed to assist in carrying items that might be awkward or cumbersome to carry by hand, and thus freeing the user's hands and arms for other tasks. For example, U.S. Pat. No. 5,318,315 to A. N. White et al discloses a hand cart that includes a plurality of passageways for receiving handles of yard tools and gardening supplies. Likewise, U.S. Pat. No. 5,203,815 to R. A. Miller discloses a cart for carrying fishing equipment and which includes tubular or cylindrical structures in which fishing rods may be placed for easy transport in a cart. Neither of these carts, however, disclose any means for transporting, in a maintained, upright position, a large container for water.

U.S. Pat. Nos. 1,832,523 to B. A. Berger; 4,313,701 to G. Brust; 517,642 to T. R. Campbell; 337,870 to F. W. Roberts; 3,389,818 to J. R. Rinehart; and 2,683,012 to J. R. Reinsma each disclose a type of cart or hand truck in which a container may be pivotally mounted in such a way that the container always remains in the upright position relative to the underlying surface on which the cart rests. The inventions of Reinsma and Campbell further show an elongated handle which is used to raise and lower the framework of the utility cart while maintaining the container in a level position. Likewise, Reinsma suggests that a short handle may be used to raise and lower the portion of the dolly that rests on the ground surface.

Standard wheelbarrows or other carts used typically for nursery or lawn work or to haul equipment and tools in the construction industry provide little adaptability for uses other than transporting bulky materials, such as, loads of bricks, concrete or cut grass and straw. Typically, these traditional wheelbarrows and hand carts are not adapted for carrying tools in an upright position; rather, the worker often attempts to balance the tools across the load in the wheelbarrow or cart, which often results in the tools and the contents of the wheelbarrow jostling out. Likewise, balancing large containers of water or other liquid in a standard wheelbarrow or other construction or garden cart would most likely result in spilling.

Neither the devices disclosed in the aforementioned patents, nor other prior art utility carts, however, employ an elongated framework for a cart that has a relatively low profile, as does the present invention. Moreover, the elongated, low framework structure used in the present invention provides a distinct advantage over these prior art carts. More specifically, the relatively large and heavy water bucket is suspended at its upper end from pivots or gimbals disposed at the upper end of a vertical ground support. This mode of suspending the bucket, combined with the bucket's horizontal displacement away from the axle intermediately between the axle and the handle, results in a cart that is much more maneuverable. Indeed, the moment arm created by the suspended placement of the bucket at this intermediate point on the relatively low-profile frame enables easier lifting and advances of the large, heavy water containers than that of the prior art carts.

Therefore, a need exists for a hand truck that can maintain a bucket or container of liquid in an upright position, that includes structures for securely carrying tools in an upright position so that the tools are easily accessible for use, and that can accommodate a box for other tools and supplies used by concrete finishers, drywall finishers or gardeners in their everyday tasks.

SUMMARY OF THE INVENTION

It is therefore an object of the present invention to provide a rugged, yet lightweight hand cart that can be used in a variety of work situations, such as, gardening, construction, or concrete and drywall finishing.

It is a further object of the present invention to provide a water cart on which a container for liquids can be suspended in an upright position even when the cart is on an uphill or downhill grade, so that when filled, the container will not tip or spill its contents.

It is yet another object of the present invention to provide a water cart having tool supports, or receptacles consisting of vertical tubing for long handled tools so that the tools can be placed in an upright fashion.

It is still a further object of the present invention to provide a utility cart which has a ground support that allows the cart to be maintained in a level position relative to a support surface when at rest.

It is another object of the present invention to provide a water cart that can accommodate a toolbox for a worker's supplies.

It is another object of the present invention to provide a cart with an elongated handle having a hooked end that facilitates raising and lowering the cart from the ground for transport purposes and which prevents the worker from repeated bending and stooping to grasp and manipulate the handle.

In accordance with the present invention, a water cart for suspension of a water bucket for use in concrete finishing work comprises an elongated open frame oriented substantially horizontally relative to a ground support surface. The open frame is of a generally U-shaped configuration with its open or leading end mounted or extending above a wheel axle and opposite to the closed end of the frame, which has a handle affixed thereto. The frame extends in a substantially horizontal direction away from the wheel axle at one end with a bucket intermediately disposed between the wheel axle and the handle. The bucket, typically a 5-gallon work bucket, is pivotally suspended from the upper free ends of a generally U-shaped bracket having opposite sides and a lower ground-engaging closed end. This ground support is permanently affixed or attached to the side bars of the open frame, for instance, by welding.

The water cart may include a plurality of tool receptacles disposed at the wheel-end of the open frame. The tool receptacles are generally cylindrical sleeves or sockets designed to receive long-handled work tools. The tool receptacles may be housed within a back wall extending upwardly from the wheel-end of the cart. A toolbox may be placed between the tires in an abutting relation to the back wall, thereby serving as a counterbalance for the bucket. A preferably cylindrical insert with a hook may be inserted into the tool supports to allow for hanging of other accessories.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a perspective view of the water cart according to the present invention;

FIG. 2 is a top plan view of the water cart according to the present invention; and FIG. 3 is a rear view of the water cart indicating more clearly the ground support and its pivotal attachment to the container.

DETAILED DESCRIPTION OF PREFERRED EMBODIMENT

Referring now in more detail to the drawings, FIGS. 1 through 3 illustrate the preferred form of a water cart 10.

As best shown in FIG. 1, the water cart 10 is comprised broadly of an elongated open frame 12 oriented horizontally relative to a support surface 13 and which has an elongated handle 14 permanently affixed to one end. At the end of the frame 12 opposite to the handle 14 are a plurality of tool supports 16, 18, 20 wherein long-handled tools, such as, brooms and shovels, may be placed. A pair of wheels or tires 22, 24 connected by an axle 25, are disposed at the end of the frame 12 approximately underneath the tool supports 16, 18, 20. A generally U-shaped ground support bracket 26 has upper free ends 28, 30 that pivotally engage a bucket or water container 32 at opposite sides and adjacent to the upper ends of the bucket 32. The ground support bracket 26 and bucket 32 fit within the center of open frame 12 with bracket 26 fixedly attached to the frame 12 approximately midway along elongated side bars 34, 36. A toolbox 38 may be placed between the tool supports 16, 18, 20 and water container 32.

As best shown in FIG. 2, open frame 12 is generally U-shaped and comprised of a pair of substantilly parallel elongated side bars 34, 36 which are connected at one end by a transverse bar 40. Opposite leading ends are mounted on the wheel axle in a manner to be described. Both the longitudinal side bars 34, 36 and transverse bar 40 are preferably constructed of metal or aluminum tubes approximately 1" in diameter. The side bars 34, 36 and the transverse bar 40 are of one-piece construction and intersect at arcuate corners 42, 44. The handle 14 is fixedly attached to the transverse bar 40 approximately midway between the arcuate corners 42, 44.

As noted previously, the elongated extension of the frame 12 in a substantially horizontal direction away from the wheel axle 25, with the bucket 32 suspended intermediately between the axle 25 and handle 14, as described below, in effect creates a moment arm about the tires 22, 24 that assists the user in lifting the bucket 32.

As shown in FIGS. 1 through 3, the U-shaped ground support bracket 26 has generally parallel sides 28, 29 joined to and extending upwardly from a ground-engaging closed end 27. The parallel sides 28, 29 have upper free ends 30, 31 which are provided with pivots 33, 35 and which engage opposite sides of the bucket's 32 upper end. Approximately midway up the vertical parallel sides 28, 29 of bracket 26, the frame's elongated side bars 34, 36 are permanently affixed to the sides 28, 29, preferably by welding. The bracket 26, with the bucket 32 pivotally suspended thereto, fits within the area between the frame's elongated side bars 34, 36 and the sides 28, 29.

The pair of wheels or tires 22, 24 are disposed at opposite ends of the axle 25 beneath leading ends of the side bars 34, 36 of the open frame 12. The toolbox 38 may be placed on the elongated side bars 34, 36 just forwardly from and above the axle 25 so as to operate somewhat as a counterbalance for the bucket 32. Preferably, braces 64, 66 fixedly join each of the side bars 34, 36 with a respective point on axle 25 proximate each of the tires 22, 24. The braces 64, 66 provide additional support to frame 12 when the heavy, water-filled bucket 32 is suspended on bracket 26.

FIGS. 1 and 2 best illustrate the tool receptacles 16, 18, 20. A back wall 56 disposed rearwardly of the wheels 22, 24 and axle 25 extends upwardly and includes preferably cylindrical housings into which long-handled tools and implements may be placed. The tool supports 16, 18, 20 and back wall 56 preferably extend upwardly to a point where these tools may be adequately supported without tipping over and falling out of the supports. An additional cylindrical tube, equipped with a hook, may be inserted into any of the tool supports 16, 18, 20, thus allowing the worker to hang small tools with handles, a jacket or perhaps a water bottle. The back wall 56 also serves the purpose of preventing the toolbox 38 from sliding off the rear end of the cart 10.

As shown in FIG. 1 and noted above, handle 14 is permanently affixed to the closed end of frame 12, extending generally horizontally and slightly upwardly from the frame 12 and terminating in a hooked end 46. The elongated nature of the handle 14, in conjunction with the slightly elevated hooked end 46 relative to the handle's point of attachment to frame 12, allows the worker to more conveniently raise, lower and draw along the cart without having to constantly stoop or bend to reach the handle 14. While the preferred handle 14 is of unitary construction in a 1" diameter tube, the handle 14 may also comprise two segments. In that case, one segment would be of a smaller diameter than the other, so that the segment having the smaller diameter could be slidably received into the segment having the larger diameter. The handle segments may be locked together by means of mating pins and bores that could provide for adjustability in the length of the handle 14, depending on which bore is used.

As described above, the cart 10 allows a relatively large and heavy container full of water 32 to swing about the pivots or gimbals 33, 35 without contacting the support surface 13 so as to adopt a level attitude to prevent spillage notwithstanding tilting of the cart 10. The bucket's 32 placement at an intermediate location between the ends of the frame 12, in conjunction with the low-profile of the frame relative to the support surface 13, creates a moment arm that allows superior maneuverability and ease in raising and lowering the cart during work. Further, the bucket's 32 pivotal extension on the ground support bracket 26 allows the worker to raise the bracket 26 from the support surface 13 when advancing the cart 10 without causing the bucket 32 to tip and thus spill its contents. When the worker rests the cart 10 on an inclined support surface, whether on an uphill or downhill grade, bucket 32 will remain in a generally upright position by pivoting about the upper free ends of ground support bracket 26.

It is to be understood that while numerous characteristics and advantages of the present invention have been set forth in the foregoing description, along with details of construction and function of the invention, the disclosure is illustrative only. Changes may be made in detail, especially in the matter of shapes, size, arrangement of parts within the principle of the invention to the full extent indicated by the broad general meaning of the terms in which the appended claims are expressed.

I claim:

1. A water cart adapted for use in concrete finishing work, said cart comprising:

a bucket;

an elongated open frame oriented substantially horizontally relative to a ground support surface, said open frame comprising a substantially parallel pair of longitudinal side bars and a transverse bar, said frame supported between a pair of tires;

a ground support disposed between said longitudinal side bars and having upper free ends provided with pivot means that pivotally engage opposite sides of said bucket whereby said bucket is suspended in an upright position relative to said support surface for swinging movement about a horizontal axis;

a plurality of tool receptacles, said receptacles extending upwardly from said open frame and housed within a back wall at one end of said open frame; and a handle extending from said transverse bar at an end of said open frame opposite to said tool receptacles.

2. A water cart according to claim 1, wherein said open frame is adapted to support a toolbox between said tires in abutting relation to said back wall.

3. A water cart according to claim 1, wherein said tires are disposed at opposite ends of an axle.

4. A water cart according to claim 1, wherein said frame is comprised of a tube of integral one-piece construction having a diameter of approximately 1".

5. A water cart according to claim 4, wherein said handle includes a substantially hooked end.

6. A water cart according to claim 1, wherein said ground support comprises a pair of vertically extending substantially parallel bars including said pivotal free ends, said parallel bars joined by a ground-engaging bar disposed at respective lower ends of said parallel bars opposite to said upper free ends.

7. A water cart according to claim 1, wherein said open frame, said handle and said tool supports are of unitary construction.

8. A water cart according to claim 1, wherein said open frame includes at least one support brace, said brace comprising a generally cylindrical tube having two ends, one of said ends fixedly engaged with said axle proximate said tire and another of said ends fixedly engaged with said open frame.

9. A water cart according to claim 1, wherein each of said plurality of tool receptacles is generally cylindrical.

10. A water cart according to claim 1, wherein said water cart is constructed of a material selected from a group consisting of steel and aluminum.

11. A water cart adapted for use in concrete finishing work comprising:

an open frame comprised of a pair of spaced and elongated horizontally extending frame members, a ground support, a handle, a back wall, and a plurality of generally cylindrical tool receptacles housed within said back wall;

a pair of tires joined by an axle and adapted to pivotally support one end of said open frame; and a bucket pivotally mounted on upper free ends of said ground support within said open frame, said bucket suspended in an upright position relative to a support surface on which said water cart is disposed.

12. In a cart adapted for use in concrete finishing work, the improvement comprising:

an elongated open frame oriented substantially horizontally relative to a ground support surface, said open frame comprising a pair of elongated and substantially parallel side bars and a transverse bar wherein said frame is supported between a pair of tires, said tires disposed at opposite ends of an axle, and wherein an end of said frame pivotally engages said axle;

a generally U-shaped ground support bracket fixedly disposed between said elongated side bars and opening upwardly from said ground support surface, said bracket comprising a pair of vertically extending, substantially parallel members terminating at upper free ends and joined by a ground-engaging bar disposed at respective lower ends of said parallel members;

a handle extending from said transverse bar at an end of said frame opposite to said wheel axle; and a bucket having an upper end and a lower end, said upper end of the bucket suspended on each side from a corresponding pivot located on each of said upper free ends, said bucket suspended intermediately between the end of said frame which is pivotal about the wheel axle and said handle end of the frame in an upright position relative to said ground support surface for swinging movement about a horizontal axis.

13. A water cart 9 with a water bucket 32 for use in concrete finishing work, said cart 10 comprising:

an elongated open frame 12 oriented substantially horizontally relative to a ground support surface 13, said open frame 12 comprising a substantially parallel pair of elongated side bars 34, 36 and a transverse bar 40, said frame 12 supported between a pair of tires 22, 24;

a ground support 26 disposed between said longitudinal side bars 34, 36 and having upper free ends 30, 31 provided with pivot means 33, 35 that pivotally engage opposite sides of said bucket 32 whereby said bucket 32 is suspended in an upright position relative to said support surface 13 for swinging movement about a horizontal axis;

a plurality of tool receptacles 16, 18, 20, said receptacles 16, 18, 20 extending upwardly from said open frame 12 and housed within a back wall 56 at one end of said open frame 12; and a handle 14 extending from said transverse bar 40 at an end of said open frame opposite to said tool receptacles 16, 18, 20.

* * * * *